H. W. HIRSCHFELD.
Tool for Ornamenting Plated Ware.
No. 220,759. Patented Oct. 21, 1879.
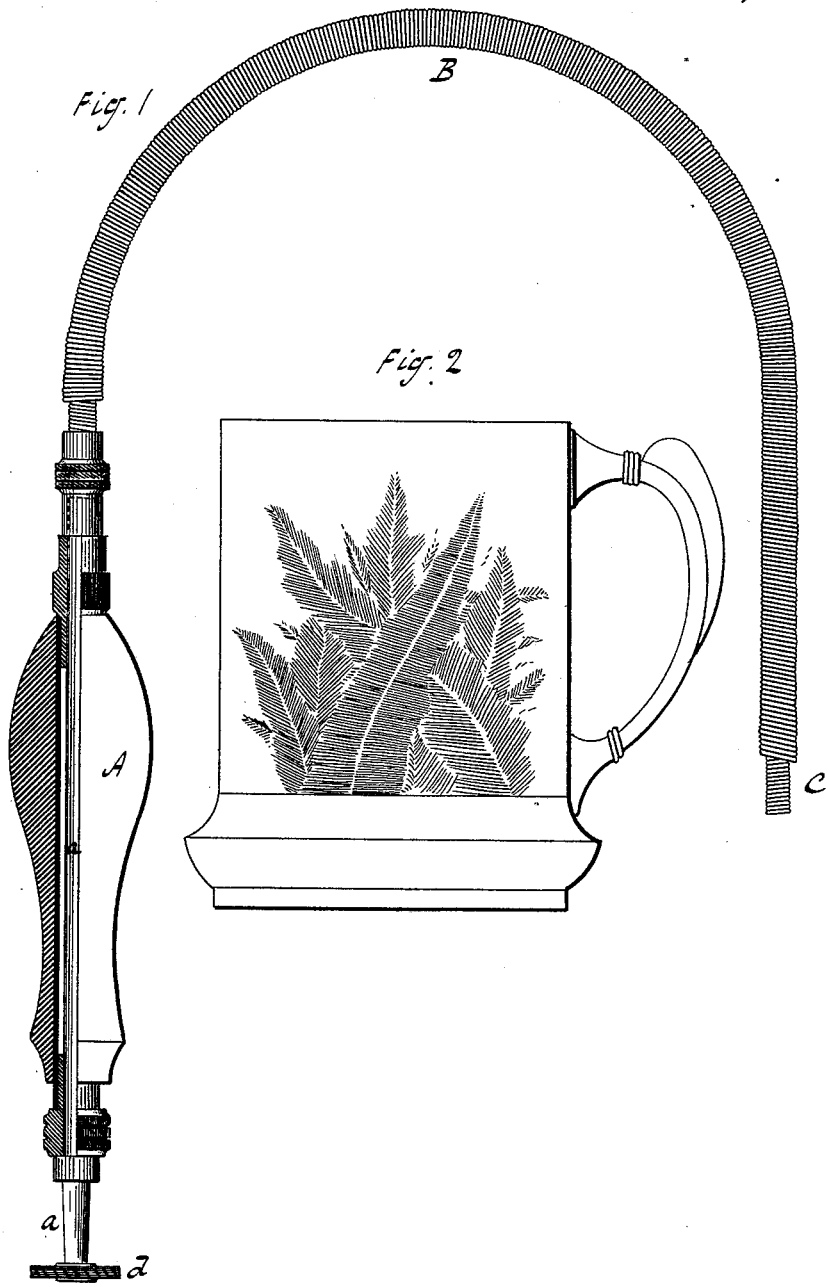

UNITED STATES PATENT OFFICE.

HENRY W. HIRSCHFELD, OF WEST MERIDEN, CONNECTICUT, ASSIGNOR TO THE MERIDEN BRITANNIA COMPANY, OF SAME PLACE.

IMPROVEMENT IN TOOLS FOR ORNAMENTING PLATED WARE.

Specification forming part of Letters Patent No. 220,759, dated October 21, 1879; application filed August 13, 1879.

*To all whom it may concern:*

Be it known that I, HENRY W. HIRSCHFELD, of West Meriden, in the county of New Haven and State of Connecticut, have invented a new Improvement in Tools for Ornamenting Plated Ware and similar articles; and I do hereby declare the following, when taken in connection with the accompanying drawings and the letters of reference marked thereon, to be a full, clear, and exact description of the same, and which said drawings constitute part of this specification, and represent, in—

Figure 1, sectional side view of the tool; Fig. 2, an illustration of the work produced by the tool.

This invention relates to a device for ornamenting the surface of silver or plated ware or articles of like character, the object being to produce a heretofore expensive ornamentation in a cheap and simple manner, and whereby the cost of such articles is materially reduced.

The class of ornamentation referred to is that produced by a succession of fine-cut lines, as for the representation of ferns or frost-work, or other ornamentation produced by such lines. Heretofore these lines have been cut by a hand-tool, it only being practical to make a single line at one cut; hence the great expense attending this class of ornamentation. An illustration of such ornamentation is seen in Fig. 2.

The invention consists in a mandrel arranged in a handle, and so as to be rapidly revolved, and carrying a wheel the periphery of which is made in the form of cutters, and so that when the surface to be ornamented is placed in contact with the wheel lines will be accordingly cut on the surface, as more fully hereinafter described.

A is a handle, of any desirable or convenient form to be taken and held in the hand of the workman. Through this handle, and supported in suitable bearings, is a spindle, $a$, arranged so as to be freely revolved in its bearings. At the tip end of the spindle the power is applied to produce the required revolution; and this is best done by attaching it to one end of a universal shaft, B—that is to say, a shaft composed of two or more spiral springs, one within the other—so that power applied to one end to cause the shaft to revolve will communicate a like revolution to the other end, whatever may be the axial position of the said other end relative to the axial line of the driven end. This class of shafting is too well known to require further description.

To the end of the spindle $a$ a wheel, $d$, is secured. In the periphery of the said wheel several annular grooves are cut, producing sharp clearly-defined ribs. Then diagonally or transversely across these ribs cuts are made, as seen in Fig. 1, which make of these ribs a series of cutters.

While this method of constructing the surface of the cutter-wheel produces the best results, it may be otherwise constructed without departing from this invention.

The operation of this tool is as follows: The end C of the shaft is attached to a revolving mandrel, or to any device through which a rapid revolution may be imparted to the said shaft, and thereby communicated to the wheel $d$. The operator takes the handle A in one hand, and in the other the article to be ornamented; or the article to be ornamented may be otherwise firmly held. He then applies the revolving wheel to the surface, following any desired line, and moving it gradually over the surface, will produce a series of clearly-defined parallel lines; and these varying in length, figures may be formed representing ferns or other designs, as seen in Fig. 2, and the work thus produced will be fully equal to any hand-work, and is made in but a small fractional part of the time required to produce the same work by hand.

I claim—

The tool herein described and shown, for the purpose specified.

H. W. HIRSCHFELD.

Witnesses:
GEO. R. CURTIS,
J. M. HARMON.